United States Patent
Sorace (10) Patent No.: US 7,247,293 B2
(45) Date of Patent: Jul. 24, 2007

(54) PROCESS AND APPARATUS FOR THE PRODUCTION OF HYDROGEN AND CARBON DIOXIDE FROM THE GASIFICATION OF RAW MATERIALS

(75) Inventor: Vincenzo Sorace, Lugano (CH)

(73) Assignee: Nesi Plant S.A., Lugano (CH)

(*) Notice: Subject to any disclaimer, the term of this patent is extended or adjusted under 35 U.S.C. 154(b) by 220 days.

(21) Appl. No.: 10/450,423

(22) PCT Filed: Dec. 18, 2001

(86) PCT No.: PCT/EP01/14958

§ 371 (c)(1),
(2), (4) Date: Sep. 24, 2003

(87) PCT Pub. No.: WO02/057396

PCT Pub. Date: Jul. 25, 2002

(65) Prior Publication Data

US 2004/0052724 A1    Mar. 18, 2004

(30) Foreign Application Priority Data

Dec. 21, 2000 (CH) .................................... 2495/00

(51) Int. Cl.
    *C01B 3/02* (2006.01)
(52) U.S. Cl. .................. 423/648.1; 423/650; 252/372; 252/373; 48/127.9; 48/198.1; 48/200
(58) Field of Classification Search ................. None
    See application file for complete search history.

(56) References Cited

U.S. PATENT DOCUMENTS

| | | | | |
|---|---|---|---|---|
| 3,481,720 A | * | 12/1969 | Bennett | 48/89 |
| 3,850,742 A | * | 11/1974 | Dugan et al. | 208/114 |
| 4,502,869 A | * | 3/1985 | Jahnke et al. | 48/197 R |
| 5,476,990 A | * | 12/1995 | Hittner et al. | 588/314 |
| 5,658,540 A | * | 8/1997 | Valentino | 423/210 |
| 6,096,106 A | * | 8/2000 | Ruhl et al. | 48/197 R |

* cited by examiner

*Primary Examiner*—Steven Bos
*Assistant Examiner*—Paul Wartalowicz
(74) *Attorney, Agent, or Firm*—Ladas and Parry LLP

(57) ABSTRACT

A process for the producton of pure syngas (hydrogen and carbon dioxide) by fast gasification of liquid, muddy, or solid raw materials, either produced for the purpose or from industrial processes in which they can not be recycled, or fuels from wastes or biomass, which process is carried out in a modular reactor including a raw materials feeding area, a gasification area, a discharging area of the residues in powdery or vitrified form. The obtained syngas is sent to a purification and compression step.

13 Claims, 4 Drawing Sheets

Figure 4

PROCESS AND APPARATUS FOR THE PRODUCTION OF HYDROGEN AND CARBON DIOXIDE FROM THE GASIFICATION OF RAW MATERIALS

FIELD OF THE INVENTION

This invention relates to a process and an apparatus for the gasification of the hydrogen and carbon molecules contained in the fed substances. These substances can be without distinction liquid, solid, and muddy and can derive from industrial processes as well as from processes of selection and treatment of municipal wastes and the like. From now on the above mentioned substances will be called "raw materials".

BACKGROUND OF THE INVENTION

The indefinite boundaries of the so called "sustainable development" clash every day with the growing needs for clean energy and with the necessity to eliminate all substances which cannot be recycled in the processes by which they have been generated or for the purposes they have been produced. Said substances are generically called wastes and treated as such in processes using rather poor technologies. The building of large dumps was the first "technological" solution of "wastes" disposal. The construction of incineration plants where the technological alternative was (and still is) between the "grid" and the "fluidized bed", overshadowed the gas combustion treatment plant, a major problem in terms of ecological efficiency (big emissions volume), energy recovery (low efficiency of recovered energy), plant size (the neutralization plant is much bigger than the incineration section), operating costs (the gas neutralization cost exceeds the incineration cost).

From what said above, it is obvious that that the incineration technology has major limits that cannot be tolerated any longer.

SUMMARY OF THE INVENTION

The present invention provides a process for the production of high purity hydrogen and carbon dioxide starting from raw materials suitably produced and/or obtained directly from the wastes, usable in any industrial or civil activities as raw material without causing atmospheric pollution. Particular attention has been paid to the prior art.

In accordance with the invention, there is provided a process for the production from liquid, muddy or solid raw materials of pure syngas comprising hydrogen and carbon dioxide with a purity of higher than 99%, the process comprising the following steps:
 (a) providing a vertically oriented monotubular reactor that widens in diameter from top to bottom, the reactor comprising a gasification area comprising a plurality of torch couples that regulate the temperature in the gasification area and provide the gasification area with a thermal profile wherein the temperature at a lower part of the gasification area is higher than the temperature at an upper part of the gasification area, the reactor comprising a feeding channel at the top such that raw materials fed into the reactor through the feeding channel flow through the gasification area to a discharge area at the bottom of the reactor;
 (b) compressing and thickening of the raw materials with the elimination of air from the raw materials and feeding the raw materials into the gasification area of the reactor through the feeding channel, the compressing and thickening generating a differential pressure that prevents air from entering the reactor through the feeding channel and also prevents syngas generated in the reactor from leaving through the feeding channel;
 (c) gasifying the raw materials in the gasification area of the reactor in a reducing atmosphere, the thermal profile in the gasification area, the rate at which the raw materials are fed into the reactor in step (b), and the particle size of the raw materials fed into the reactor in step (b) being controlled such that, in the gasification, there is no accumulation of the raw materials within the reactor and only solid residues which cannot be gasified descend into the discharge area at the bottom of the reactor;
 (d) gathering the solid residues which cannot be gasified in the discharge area; and
 (e) recovering syngas generated in the gasifying step (c) and treating the recovered syngas to obtain the pure syngas comprising hydrogen and carbon dioxide with the purity of over 99%.

In accordance with one embodiment of the invention, there is provided a process according to claim 9, wherein the gasification area of the monotubular reactor consists of a plurality of thermal zones, obtained in cylinder sections of ≅1 to 3 m length, having inner diameter between ≅0.5 m min. and ≅2.5 m max., wherein a working temperature of each of the plurality of thermal zones is set between ≅350° C. and 1200° C.

In accordance with another embodiment of the invention there is provided a process according to claim 3, wherein each of the thermal zones has its own couple of torches, wherein temperature in each of the thermal zones is measured by a thermocouple which, through an electric circuit, regulates the flow of fuel and oxygen, as comburent, dosed in stoichiometric ratios.

A comparative analysis clearly shows the substantial novelties of the present invention. In support of this statement see the enclosed table where the characteristics of the main ten patents, the ones considered the most significant and similar, are compared with the present patent application.

TABLE 1

| | Patent no. | | | | | |
| --- | --- | --- | --- | --- | --- | --- |
| | EP0292987 | EP0545241 | JP6009967 | DE4313613 | EP0653478 | DE4412360 |
| Inventor | Tognazzo Val. | Goehler Peter | Takeuchi Y. | Eichler Diet. | Jungk Klaus | Rabe Wolfgang |
| Publication | Nov. 30, 1988 | Jun. 9, 1993 | Jan. 18, 1994 | Oct. 27, 1994 | May 17, 1995 | Oct. 19, 1995 |
| Raw material Feeding method | Thermal dispersion mill | Grinding | Not declared | Milling | Not declared | Atomization in liquid phase |

TABLE 1-continued

| | | | | | | |
|---|---|---|---|---|---|---|
| Fuel | Hydrogen | Syngas | Natural gas Raw materials | Natural gas | Natural gas Raw materials | Raw materials |
| Comburent | Oxygen | Oxygen | Oxygen | Air | Air | Oxygen |
| Working Temperature | >1600° C. | 650° C. pyrolysis 1400° C. gas. | 800/1000° C. | 1200° C. | Low temp. | 1300/2000 |
| Variable thermal profile | NO | NO | NO | NO | NO | NO |
| Reactor type | Vertical, three Chambers | Horiz. Pyrol. Vertical gas. | ? | cylindrical? | Horizontal Rotary | Vertical |
| Process Residues | Vitrified | Vitrified | Ash | Carbonaceous (CARBONOSO) | Carbonaceous | Vitrified |
| Energy recov. method | $H_2$, $CO_2$, $H_2O$ | Syngas | Fuel for gas turbine Methyl alcohol | $H_2$ and $CO_2$ | Syngas | Syngas |
| Accumulation in the chamber | NO | YES (pyrolysis) | YES | YES | YES | NO |
| Reaction type | Gasification | Pyrolysis Gasification | Gasification | Gasification | Pyrolysis | Gasification |

| | | | | | |
|---|---|---|---|---|---|
| | | | Patent no. | | |
| Inventor | DE4444845 Kuehschweiger | WO9640843 Bishop N. | WO9715640 Sharpe John | EP0837120 Tomadini | Present patent application Sorace Vincenzo |
| Publication | Jul. 18, 1996 | Dec. 19, 1996 | May 1, 1997 | Apr. 22, 1998 | 2000-12-XX |
| Raw materials Feeding method | Drying Double channel | Grinding | A SPINTA | TAL QUALE CON TRITURAZ. | Differential pressure Thickening controlled milling fluidification |
| Fuel | Solid | Natural gas | Raw materials | Natural gas Raw materials | Natural gas |
| Comburent | Hot air | Oxygen | Air | Air | Oxygen |
| Working Temperature | High temp. | 650/800 | 600/1000 | 700/800° C. | Variable thermal profile 350/1200° C. |
| Variable therm. Profile | NO | NO | NO | NO | YES |
| Reactor type | Vertical | Horizontal Rotare | Vertical | Vertical | Variable section vertical monotubular |
| Process residues | Vitrified | Carbonaceous | Ash | Carbonaceous | Powdery or vitrified |
| Energy recov. method | Thermal energy | Syngas | Thermal energy | Syngas Steam $CH_4$ | $H_2$, $CO_2$ |
| Accumulation in the chamber | NO | YESI | YES | YES | NO |
| Reaction type | Gasification Combustion | Gasification | Pyrolysis Gasification Combustion | Slow pyrolysis | Fast gasification |

In particular the object of the present document is a process for the treatment and conversion of raw materials, including the following phases:
1. combined feeding and dosing of raw materials
2. fast pyrolysis with gasification of the molecules contained in the fed materials
3. extraction of the gasification solid inerts in powder or vitrified form
4. neutralization and purification of the obtained syngas
5. syngas compression
6. catalytic conversion of CO in $H_2$
7. separation of the carbon dioxide contained in the syngas
8. separation of the hydrogen contained in the syngas
9. recovery and re-use of the residual syngas mixture Another object of this invention is an apparatus for carrying out the above mentioned process.

The above mentioned phases foresee the following steps:

1. Process
A. The raw materials which can be liquid, solid or muddy and which are divided in homogeneous groups, are dosed in qualitative-quantitative ratio so that the quantity of $H_2$ and C contained, guarantees the final production of $H_2$ and $CO_2$ allowing the process economic maintenance. In this feeding step, all operations and equipment are well known. On the other hand, the sequence and the procedure in which these operations for feeding solid raw materials are effected are new and very important for carrying out the fast gasification. If it is considered that the compression and thickening of raw materials, due to the elimination of the air contained therein, the fact that the compressed raw materials themselves prevent air from entering, that subsequently the grinder allows the fluidification to a controlled size, make a sequence of operations which allow the gasification at the desired times and modes. The raw materials are fed through differential pressure systems which prevent the air of the atmosphere from entering the reactor, and, viceversa, prevent the syngas inside the reactor from coming out and spreading into the atmosphere. The use of metering pumps, gear pumps, monoscrew or piston pumps according to the suspended solids density and content is foreseen for liquid and muddy substances. These substances, before being added to the reactor, are subjected to preheating up to ≈110° C., to reduce the boil-off time of the liquid fraction fed into the reactor. If necessary, the solid substances should undergo separation of the metallic components and of most of aqueous fraction, before their feeding. In case of a size larger than 20 cm., one has to start with the primary grinding, an operation which is run near the storage tanks. A pneumatic- or mechanic-type transport system (belt conveyors, redlers etc.) will move the already pre-treated raw materials near the reactor-loading door. The solid substances undergo a thickening before their introduction. This is obtained through oil-pressure push pistons which compress the fed solids, by eliminating the air contained into them almost totally. The solids, which are in thickening phase are pushed into the reactor through a calibrated mouth, thanks to a higher pressure. In this way a feeding differential pressure is reached allowing, by making a physical obstruction, the solid substances feeding without the air being able to penetrate into the reactor, and without the syngas being able to go up again into the feeder channel. The raw materials, thickened in the differential pressure feeding system, meet a mill as primary element of the reactor, which is equipped with a screen allowing to obtain reduced and exact granulometries and sizes. These characteristics are the essential condition for carrying out the fast pyrolysis in the following reactor sections.

B. Fast gasification

The raw materials are gasified inside a vertical expansion monotubular reactor. The cracking process is a chemical decomposition process exclusively caused by the thermal energy intervention. In case of lack of air (and of oxygen in excess) and therefore in reducing ambient, the cracking causes thermal-chemical decomposition of the organic matter. This endothermic process produces the decomposition of the complex molecules forming the fed raw materials, transforming them into an uncondensable gaseous phase (syngas) mainly composed of hydrogen, carbon monoxide, nitrogen, carbon dioxide, and, containing lower amounts of chlorine, sulphur, fluorine and any metals present in the fed raw materials.

The reactor is kept at a programmed temperature whose thermal profile can start from a minimum value ranging from ≈350° C. to ≈600° C. along the reactor length in the feeding section (reactor top) and can reach ≈1200° C. in the final gasification section (reactor bottom). In case of fine, very reactive or low melting powders, the starting and final temperatures can be lower (≈300-≈800° C.). The minimum length of the reactor gasification area should be approximately 8 m., while the maximum one can reach about 30 m.

The reactor gasification portion is sized the mean velocity of the generated syngas ranges between 3 and 4 m/sec. Consequently the section of this reactor portion may vary, as each cross area is sized according to the mean gas flow rate which is calculated at that point, which depends on the local working temperature. The thermal profile of the reactor is obtained by subdividing the portion of the reactor in which gasification takes place into at least 1 meter long thermal areas. One (or more than one) torch is located in every thermal area. The number of torches may be increased as the branch section and plant capability increase, in order to guarantee the achievement of the programmed temperature. The torches are fed with oxygen, as a comburent, and with combustible gas, which are added at substantially stoichiometric ratios. The above mentioned 8 meter long gasification portion of the reactor consists of 8 thermal areas, having the same length. The thermal profile depends on the type of fed raw materials or possibly on their mix. According to the quantity of water, the quantity and the quality of the inorganic material, the particle size and consequently the reactivity of the fed substances, it may be in some cases necessary to set such a thermal profile as to reach the max. temperature in as minimum a time as possible (see graph 1), while in other cases it could be more convenient to reach the max temperature only in the final part of the gasification portion (see graph 2).

Two examples of the thermal profile for the gasification portion, supposed to be 20 m. long, are reported in the annexed FIGS. 5A and 5B.

C. Discharging section of the gasification solid residues

This step can be carried out in two different ways and the choice will depend above all on the average typology of the raw materials which are fed to the plant, and by the final destination of the obtained residues. The technologies used for the discharge of these residues are per se known. On the contrary, the possibility of use, as alternative, of such two different systems at the gasification section of the same reactor, is new. In fact, using the variable thermal profile it is possible to obtain the solid residues entering at this step at a more suitable temperature for carrying out the treatment. A further novelty is that the solid residues pass from a reducing atmosphere to an oxidizing one, at controlled percentage, thus promoting the thermoxidation of the carbon present therein.

C1. Discharge in powdery form

The powdery form discharging system is preferable when the discharged inorganic substance can be easily re-used in industrial processes. This may be obtained when predetermined ratios of very homogeneous raw materials are fed to the plant. The discharge of these residues in powdery form is obtained by means of a final oxidation chamber, horizontally set under the gasification chamber of the reactor. This chamber is refractory lined and equipped with one or more torches which are fed by the comburent in excess in order to guarantee the thermoxidation of the extracted residues. An archimedean screw, placed at the bottom of this chamber, pushes the gasification residues into a special section outside the reactor. The screw is maintained at constant temperature by means of a diathermic oil cooling circuit.

C2. Discharging in vitrified form

This system is preferable if the inorganic substance, extracted in the powdery form, is not directly used but is indeed an environmental risk. Vitrification is carried out by raising the temperature of the residual inorganics until they melt (≈1500° C.), then abruptly cooling them in water. A special melter (melting chamber) (alternatively to discharge in powdery form by means of a screw) is located under the gasification chamber. The melting chamber is equipped with two or more torches to supply the heat necessary for the fusion. In this way the inert mass, now liquefied, flows by gravity, to the reactor outlet.

The melter, which is also equipped with refractory lining, has an appropriate inclination. This chamber serves as homogenization chamber and as oxidation chamber of the carbon absorbed in the molten mineral and metallic mass. Two or more torches are installed on this fusion chamber. Said torches are fed with fuel and an a comburent excess (2-4%) to the stoichiometric ratio, in order to ensure oxidation of the residue carbon before discharge.

The outlet, which is located at the end of the homogenization channel, allows the fused mass, thanks to the chamber inclination, to flow into the water basin below, where vitrification takes place due to the violent cooling.

D. Heat recovery

The syngas exiting the gasification chamber is conventionally fed, to a heat exchanger. In this way a part of the syngas enthalpy is recovered to produce. The syngas enters the exchanger at about 1200° C. and comes out at about 250° C. The steam produced at about 25 bar pressure is used in the column for the conversion of $CO+H_2O$ into $H_2+CO_2$.

E. Syngas neutralization and purification

The syngas produced in the gasification reactor can contain different impurities from the fed raw materials. These impurities, such as HCl, $H_2S$, HF, $SO_2$, metals and possible carbon black are conventionally removed in the neutralization and purification section, which is formed by a multi-step system. The first step consists of a quencher where the syngas is subjected to sharp cooling, by means of water, decreasing the temperature from 250° C. to 90° C. Then at the second step, the syngas undergoes acid scrubbing during which metals and powders are absorbed. At the third step the syngas is subjected to a basic washing, through which any acid substances still present are removed, then it is cooled to 40° C. The substances removed through the various cleaning steps are present in the scrubbing waters, which are in turn purged by precipitating off the pollutants, in order to allow the water recycling.

F. Syngas compression

The syngas, now completely neutralized and cleaned, is conventionally fed to a multi-stage compressor where they are compressed under a pressure of about 25 bars.

G. Separation and storage of the produced pure gas

The syngas mixture composed of $H_2$, CO, $CO_2$, $N_2$ is fed to a set of columns for the well known steps hereinbelow described:

G1 catalytic conversion of CO into $H_2+CO_2$ (84% conversion performance)

G2 separation of $CO_2$ (97% performance) through absorption and sending to storage as liquid, ready for marketing phase G3 separation of $H_2$ (81% performance) through absorption on molecular sieves and sending to storage having a pureness of 99.9%; ready for marketing or recycling as energy source.

H. Recycle of the residual syngas mixture

A residual syngas mixture, composed of $H_2$, $N_2$, CO and $CO_2$, comes out of the separation columns. This mixture is sent to the production group of thermal energy (boiler for steam production) or electric energy (turbine—Otto cycle engine).

The present invention also relates to the equipment for carrying out the process according to the invention.

2. Equipment

The most important apparatus of this process is the gasification reactor. This reactor is consists of three portions, which are integral part thereof. The first portion consists of a feeding section, at differential pressure; the second one consists of the variable thermal profile gasification area; the third one consists of the gasification solid residues discharging system.

2.1 Raw Materials Feeding Area

The feeding and dosage of the raw materials ave great importance for carrying out the process of the invention. Very important elements are in fact the feeding continuity, the size of the fed solid material and the feeding differential pressure as blockage system, in order to prevent ambient air from entering the gasification reactor. The equipment described in this section is well known, while the novelty lies in the sequence of the operations effected during the feeding of a gasification reactor. The raw materials to be fed to the gasification reactor are stored in basins or silos, and their size is not larger than 20 cm. They are divided into homogeneous groups so that they can be easily fed to the feeding group, which is located at the top of the gasification reactor, through traditional transport systems.

The following areas form the raw materials feeding group (see FIG. 2):

receiving and compaction area

Figure 1:
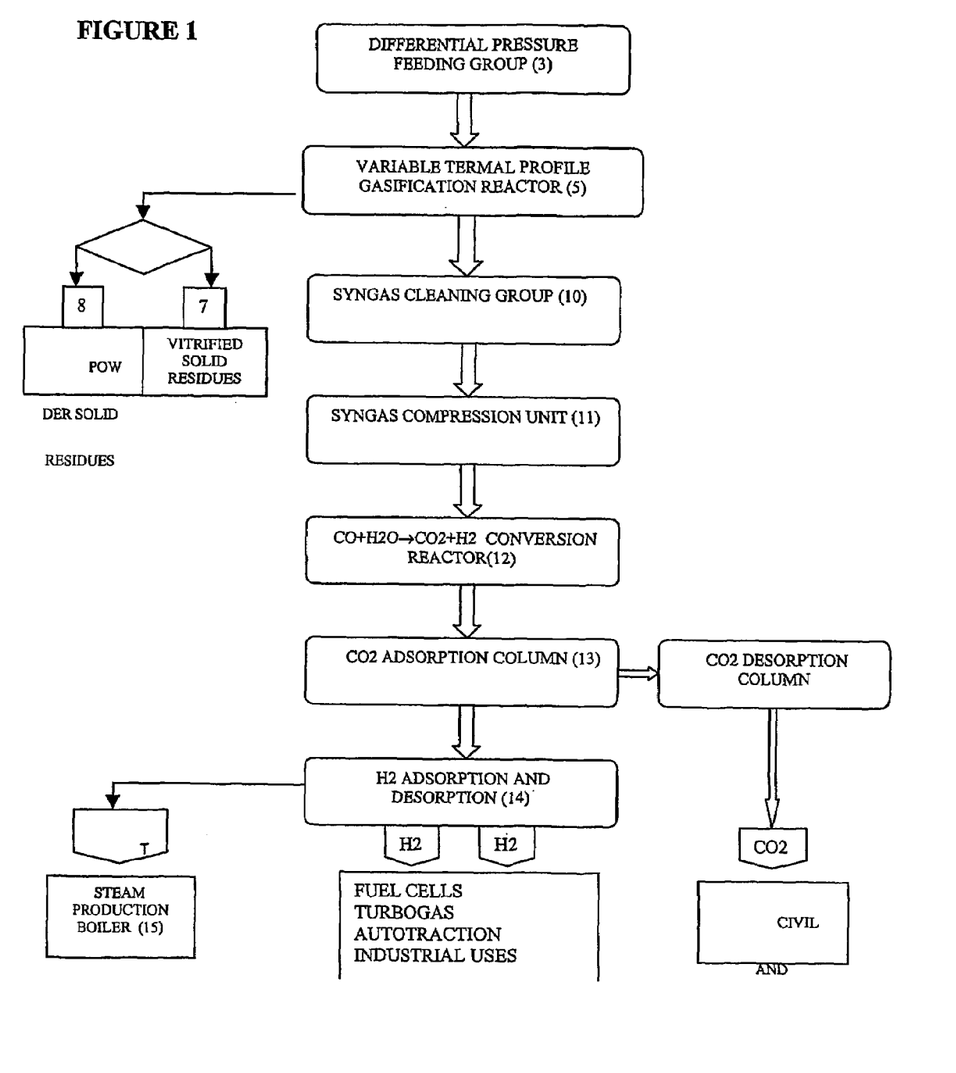
FIG. 1 of the process according to the present invention
Figure 2:
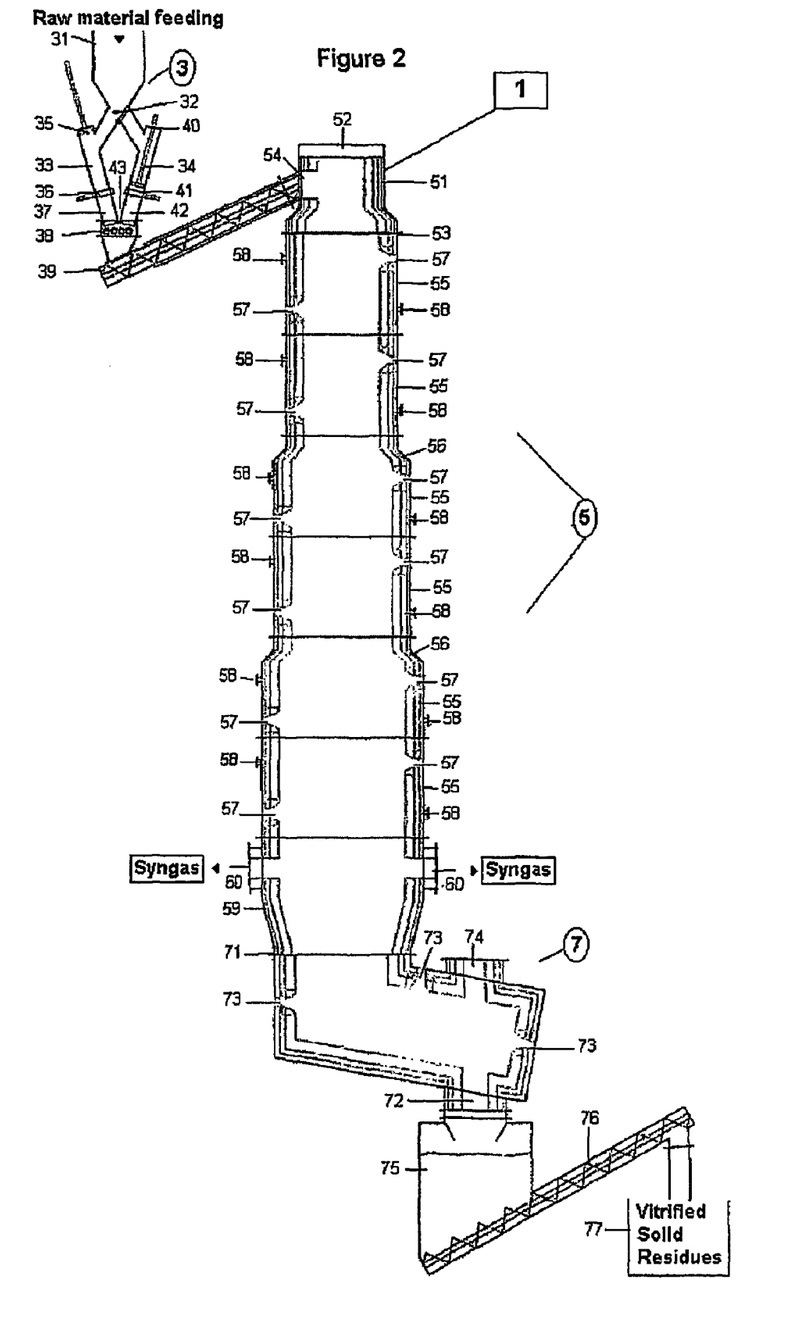
FIG. 2 Scheme of the gasification reaction apparatus according to the present invention, with the discharge of residues in the vitrified form.

This area is double to guarantee a continuous feeding to the gasification reactor. The raw materials from the storage tanks are loaded into the feeding group service tank. At the discharge point of this service tank, a two-way valve is present to send the raw materials into the thickening channel 33. When this channel is full, the raw materials are loaded to thickening channel 34. In the meantime, channel 33 is closed and the contained raw materials are thickened by operating the push piston 40. When the desired thickening is reached (0.6-0.8 Kg/dm3) the push piston is stopped and the slide door valve 36 is opened. This valve links the thickening channel to the feeding one, whose section is slightly smaller than the channel preceding it. The push piston is operated again to continue its travel, which had been previously blocked by the valve opening, and it pushes the thickened raw materials slightly beyond the slide door valve 36, but stopping at least 50 cm. far from the grinder. The cross area of the feeding channel is smaller than the receiving channel, thereby further thickening the raw materials, thanks to the push piston action, and completely occupies the channel passage section, thus forming a plug, which is replaced at every push of the piston and effectively prevents the ambient air from entering the reactor. When the push piston ends its running, it is moved back to its starting position, the slide door valve 36 is closed and the thickening channel is opened for the next loading, by operating the two-way valve. In the meantime, the same operations as described above are repeated in the thickening channel 34 which is also equipped with a push piston, a slide door valve 41 and a feeding channel 42. In this way, with alternating operations in sequence the continuous feeding to the gasification reactor can be guaranteed. The dosage of the fed raw materials is obtained by regulating the speed of the push pistons 35 and 40. The feeding group, with the double sequential loading system, is totally operated by an oleodynamic system which provides automatic working. The two feeding channels flow together in a single collection point where a conventional mono-shaft mill, equipped with interchangeable sieve, is located. This apparatus provides precise, reduced particle size (which is a paramount condition for the fast gasification), whose max. size will be 20 mm. for raw materials having very small thickness, and will decrease as the thickness increases.

In case of large plants it can be useful and convenient to install a mill on each feeding channel.

The ground raw materials are fed to the gasification reactor entrance through an archimedean screw. The end portion of the feeding channel, the mill and the archimedean screw for the transport to the reactor are continuously made inert by a $CO_2$ flow which ensures working safety, by preventing any backflashes or overheating in said restricted areas of the plant. As regards liquid raw materials, they are fed into the reactor by a pump ensuring a pressure of at least 5 bars. The pressurized liquid is fed to a lance, on whose final part, which is located inside the reactor, a nozzle is installed which carries out the mechanical atomization by transforming the liquid stream into a conic jet composed of very small droplets. The lance should be located on the gasification reactor in correspondence of a thermal area of at least 700° C. The liquid raw materials feeding group consists of the following equipment:

medium head pump
    electronic volumetric meter for the flow rate control
    valve for the flow rate electronic regulation
    heat exchanger for the fed liquid preheating ($\approx$110° C.)
    lance for the mechanical atomization 2.2 Gasification Area The gasification area of the reactor of the invention is designed to cause continuous fast gasification reaction.

This area of the reactor consists of a series of cylindrical sections, one on top of the other, having different diameters. On each section, a couple of torches, at least one meter far from the other, are positioned with corresponding thermometric tracking: the number torches couples depends on the diameter and length of the section and on the plant capability. The torches are fed with oxygen (as a comburent) and with the gaseous fuel available (methane, propane, syngas, etc.) in a stoichiometric ratio.

The monotubular reactor is made of cylindrical sections, equipped with suitable frustum-cone tapers, which make them superimposable even in presence of different diameters, thereby allows a modular structure and the possibility to move them, even having the refractory lining already installed. This feature enables the reduction of assembly time at the yard also as regards reactors with max flow rate allowed (10 ton/h), as all plant parts can be pre-assembled at the workshop and then be moved and definitely assembled at the final destination place.

The advantage of this solution is that, by completing the construction steps in the workshop (mechanical structural works, refractory lining), the work quality is considerably high, the construction costs decrease, the carrying out time is shorter. Furthermore, the building modular structure allows to have spare reactor sections in the workshop, thereby making the replacement of a spare section for a broken one easily possible and convenient, minimising the stop plant time to the advantage of the production.

The gasification area consists of a series of cylindrical sections,one on top of the other. All these sections have a three layers refractory lining, having different thickness, which allows to have a max. working temperature of 80° C. on the external surface made of carbon steel. The lining layer on contact with the syngas will have an at least 80% alumina content, weighing at least 2.8 Kg/dm3.

On a side of the first cylindrical section, located at the top of the gasification area, a door is set for the connection of the screw transporting the ground raw materials from the feeding section. The reactor can be equipped with one or more feeding sections so that to gasify, at the same time, raw materials which are physically different, and that, for safety or process reasons, can not be mixed together. The bottom of this first cylindrical section is connected to the cylinder below, the upper part is closed by a door that can be opened, in order to make the inspection into the reactor easier. This first cylindrical section is lined and a cooling liquid is circulated in the interspace to avoid overheating and to keep the working temperature in this area constantly lower than or equal to 150° C. The hot liquid from this section is sent to the interspace of the feeding screw, that is lined too, thereby preheating the fed raw materials, by the recovered heat.

After the first cylindrical section for the introduction of raw materials, we consider now the next cylindrical sections which compose the gasification area. This area of the reactor consists of a series of coupled cylindrical sections, with coupling flanges in order to be always superimposable for a vertical development. The length of each cylindrical section has to be modular according to the total dimensions of each reactor. For example, the gasification chamber is 12 m high and can be composed of 12 cylindrical sections 6 m high, of 3 sections 4 m high, or of a middle solution to the ones indicated. The choice depends on the desired handiness, deriving from the section and weight of each section, during the building and assembly steps. The diameter of each cylindrical section depends on the expected quantity of developed syngas expressed in Nm3/h and consequently on the flow rate in Kg/h of the fed raw materials. The speed of the developed syngas, considering the working temperature of each cylindrical section, should range between approximately 3 and 4 m/sec. To guarantee constant speed, the cross area (in m2) and the diameter of the cylindrical sections should constantly increase as the developed syngas quantity and volume increase. For this reason the reactor cylindrical section, having a larger diameter than the above section, is equipped with a frustum of cone having end coupling flanges that can be coupled with the smaller diameter cylindrical section. In the gasification area of the reactor, the height and the numbers of the thermal regions subjected to the direct radiation of the torches are sized according to the criteria described below. The height of the gasification area should be calculated in order to guarantee to the substance to be gasified an at least two second contact time in the thermal areas subjected to the direct irradiation. The number of the thermal regions depends on the gasification area length, considering that each thermal region should not exceed 3 meters length and be equipped with at least one or more couples of torches. The gasification area of this reactor provides fast gasification with max. performance, thanks to the fluidification and to the size of the raw materials from the feeding section, to the constant speed of the syngas in it, which is obtained through different diameter parts and through the use of the variable thermal profile. This means to feed the discharge section only with the solid residues which cannot be gasified anymore. This result is very important because in the reactor there is no accumulation of the raw materials to be gasified, allowing in this way the standard setting running in a few seconds at the feeding start up, and the syngas (flammable and toxic) production stop in a few seconds at the feeding stop. In this way in every moment both the complete control of the process and therefore the working max. safety are guaranteed. The safety aspect, as regards the adopted solutions, is even more highlighted if it is considered that the useful volume of this reactor, compared to any other equal power solution, is drastically smaller, as well as the syngas volume at stake is, allowing a total inertization with nitrogen or $CO_2$ in very short time in case of emergency.

2.2.1 Thermal Profile

The thermal profile of the gasification reactor is reached and maintained through the series of torches which are installed at the suitable reactor section. The torches are built in thermal steel and the part entering the reactor has a cooling jacket to avoid dangerous overheating. For this reason a suitable cooling circuit has to be made for all the torches of the reactor. Each torch is equipped with a start electrode, a flame detector and its own temperature detector sensor, located on the wall of the gasification chamber at the same height as the torch, but diametrically opposite to the torch itself. Combustible gas and comburent gas feeding takes place through two concentric channels, suitably foreseen in the torch., which allow the flame firing just at the head of the torch itself. A static mixer is installed at the combustible gas entrance, for homogenising the fed fuel mix in case of syngas is simultaneously fed. The fuel and comburent flow rate is constantly and electronically monitored to measure and dose the quantities at stoichiometric level. Each torch will be equipped with electronic meters and proportional valves for the combustible and comburent gas and the syngas. It will be possible to set the flow rate values of each fed gas in the control room, and these will be automatically maintained. The combustible gas flow rate regulation of each torch is automatically determined by the temperature measured by the suitable sensor located close to the torch itself. The comburent flow rate regulation of each torch is automatically determined by the quantity of the fuel fed to the torch, according to the set stoichiometric ratio. In this way it is possible to set the temperature value (in the different reactor areas) related to the thermal profile set for that reactor or that specific application.

At the end of the gasification area there is the connection cylindrical section, which is equipped, in the upper portion, with a flange for the connection with the last cylindrical section of the thermal areas. At least two doors are foreseen on their walls and they are located at 180° one from the other for the generated syngas emission. The lower section, from the connection cylindrical section, has a frustum-cone for the coupling with the discharge area of the inorganic and mineral residues present in the raw materials fed to the gasification reactor.

2.3 Solid Residues Discharge Area

The discharge section of the gasification solid residues, to be installed in the lower part of the reactor, is foreseen in two working procedures and consequently has two different realization solutions. A farther feature of this reactor is the double possibility of solid residues discharge of which it can be equipped with, thanks to the variable thermal profile which allows to provide these residues, entering this area, at a more suitable temperature according to the final treatment they have to undergo. All the equipment described in this chapter is well known, the novelty is the double possibility of discharge and the operating procedure in a slightly oxidizing atmosphere connected to a section of the reactor in highly reducing atmosphere.

2.3.1 Powdery Residues Discharge

The first solution foresees the discharge of the residues in solid powder form. This solution is adopted when, because of the typology and the homogenization of the raw materials fed to the gasification reactor, it is possible to characterize the quality of the residual inorganic substances, assigning them to the re-use in the same process they come from, or as raw materials in other processes.

This recovery process is carried out through a chamber for the final oxidation of the solid residues, that is linked to the lower section of the. connecting cylindrical section.

This chamber consists of an horizontal cylinder, lined like the one described for the gasification chamber, inside which a screw is located. The diameter of the cylinder is at least double than the max diameter foreseen for the screw, which is sized for the max flow rate of the foreseen powders. The screw is installed at least 1-2 cm far from the lower part of the cylinder, letting the volume between the screw and the upper part of the cylinder free. One or more torches are installed in this portion, according to its length, thereby providing the final thermal oxidation of the powdery residues. The torches are fed with a slight excess of comburent, thereby allowing the oxidation of any residual organic carbon present in the powders. The chamber length is related to the residence time the residues in this section should have. The working temperature in this section is about 700-800° C., and it is determined by the residues melting point, which has not to be exceeded for not risking the melting. The screw is kept at 250° C. thanks to a cooling liquid circulating inside it. The residual powders, pushed by the screw, are discharged through the suitable outlet at the end of the cylinder, at the lower part. These powders are fed to a mobile container, which should be tightly sealed to prevent the ambient air from coming into contact with the atmosphere of the gasification chamber.

2.3.2 Vitrified Residues Discharge

The second solution concerning the solid residues discharge system, foresees their vitrification. This solution is adopted when, due to the typology and the heterogeneity of the raw materials fed to the gasification reactor, it is impossible to re-use these solid residues in other industrial processes; or, due to their analytical characteristics, these solid residues can be an environmental risk. In this case the solid residues are vitrified by melting, followed by abrupt cooling in water. The vitrified residues are completely inert as the process is irreversible because the solid residues are included inside the vitreous matrix.

This inertization process is carried out in a final discharge area of the residues, connected to the gasification chamber. The discharge chamber consists of a parallelepiped chamber horizontally set, having 4-8% inclination and the lowest point at the discharge door arranged on the lower side. This discharge section is lined with refractory materials similar to those mentioned for the gasification chamber, but the refractory layer in contact with the melted solid residue is thicker because of the higher working temperature and contains special additives to provide higher abrasion resistance. On the upper side opposite to the discharge door, a flanged opening allows assembling to the lower part of the connection. cylindrical section of the gasification area. The upper side of the melter has an elliptical form allowing to obtain a vaulted roof, through the refractory lining, necessary to a better radiation of the lower side. The melting chamber length should be at least larger than the max diameter of the gasification chamber, and it is determined by the residence time set for that application. The working temperature of the melter is about 1500° C.

This thermal running is obtained by 3 torches at least, which are fed with gaseous fuel and oxygen as comburent. Oxygen is dosed in a slight excess to the stoichiometric, to guarantee a slightly oxidizing atmosphere, which attains oxidation of any carbon included in the solid residues.

These solid residues from the gasification process settle on the initial part of the fusion chamber. They are melted, thus becoming a liquid substance which, due to the inclination of the chamber itself, go along its length flowing then into the water basin below, through the discharge door. This basin consists of an at least 2 $m^3$ vol. parallelepiped container, kept at constant level with water for 50% of its volume. In the upper part of this container there is a section for the tight flanged connection to the discharge door of the melter. In the lower part of the container a screw is located, having a 45° inclination. The screw length is determined by the height of the discharge point of the screw itself. The discharge point should be at least 1 meter higher than the water level inside the container. In the first section of the screw, which is water-tight, the water level will be the same as that in the container. Thanks to this solution the gasification solid residues the discharge section and melted because of the temperature, fall into the water and shatter, and because of the violent cooling, they vitrify. The screw, located at the lower part of the container, continuously transports the residues to the container below, for storage. The constant water level makes, during the working, an hermetic seal barrier preventing the contact between the external atmosphere and the reactor internal one.

2.4 Heat Recovery

The syngas which is generated in the gasification chamber comes out through two flanged connectors set at 180° one from the other. Two heat exchangers are connected to each of these connectors in order to cool the syngas from ≅1200° C. to ≅250° C., recovering the heat for steam production. The heat exchange takes place between the syngas which flows inside the pipes and the diathermic oil which flows outside the pipes. The diathermic oil circulates in a close circuit connected to the steam generator where the enthalpy in of the syngas is recovered. The generated steam is used in the conversion reaction $CO+H_2O \rightarrow H_2+CO_2$.

2.5 Syngas Neutralization and Cleaning

The syngas neutralization and cleaning are carried out in a high performance multi-stage system so that the syngas which comes out shows no incompatibility with the following reaction stages. The syngas may contain varying quantities of carbon black, metals and acid substances, according to the typology of the fed raw materials. The multi-stage system foresees specific treatment sections for each typology of present pollutant. For this reason each treatment area should be equipped with a specific circuit for a specific pollutant or pollutants group absorption to separate and possibly recover the absorbed substance. As a consequence, there is not a fixed scheme which is valid for all the typologies of raw materials that can be fed to the plant. However the multi-stage units will substantially correspond to what follows here.

The first unit consists of a quencher for the syngas cooling and saturation in water. The syngas temperature decreases from ≅250° C. to ≅90° C. and the saturation in water provides better efficiency in the next treatment stage. The quencher consists of a steel cylinder equipped with a hydraulic circuit, fed by a suitable pump, and of a series of a vaporiser nozzles located on the wall, which continuously spray the syngas.

The second unit consists of a variable throat venturi. The feature of this plant section is the high efficiency of separation of any carbon black contained in the syngas (in the form of micron powders), even in the presence of continuous flow rate changes. As in this case the efficiency is directly proportional to the pressure drop, it is very important to guarantee the established pressure drop design value constantly. The circulation liquid is fed in the upper part of the venturi through tangential pipes which force the liquid to rotate on an opened surface and to flow along the converging section up to the throat. The liquid is also fed through a pipe, centrally placed, which sends the liquid itself to the top of the central cone. This liquid flows down along the divergent wall of the central cone to the throat. At the throat entrance a mist develops in front of the gaseous stream.

The gas collides with the above mentioned mist and causes the atomization of the liquid. The solid particles are captured by the droplets thus making the scrubbing. The throat of the venturi is adjustable. The venturi is equipped with a central bob that can move vertically in order to change the passage area through the throat. In this way the gas optimum speed through the throat can be maintained within a wide range of gas flow rates, always keeping the pressure drop and equipment in full working optimal conditions. The axial movement of the central bob is operated by a pneumatic cylinder having a proportional drive according to the signal from the suitably installed differential pressure electronic transmitter. The process liquid is recycled by a suitable pump and continuously filtered to separate the particles which are absorbed in it. These particles, mainly consisting of coal dust, are fed again to the gasificator.

The third unit consists of a multi-stage scrubber, which consists of a column inside which there are at least three hydraulically separated areas. In the first area, intended for the absorption of any metals contained in the syngas, contains a series of suitable trays on which the absorbing solution, kept at acid pH, is circulated by a pump. The circuit of this solution is equipped with a suitable treatment section where the contained metals are precipitated, filtered and separated, and the solution is recycled. Another series of trays is located in the second area which is destined for the acid substances neutralization. On these trays the neutralizing solution, kept at basic pH, is circulated by a pump. The circuit of this solution is equipped with a suitable treatment section where the obtained salts are precipitated, then filtered and separated, and the solution is recycled.

The third area consists of a high efficiency demister for the separation of the microdrops which are dragged in the purified syngas.

2.6 Syngas Compression Unit

The neutralized and purified syngas are fed to a multi-stage compression unit having the task both to avoid the pressure drops which are generated by the equipment set above it and to compress the syngas to the 25 bar pressure, necessary to the next reaction steps. As the working pressure difference upstream and downstream the compressor is too high (from atmospheric pressure in the gasification chamber to 25 bars in the columns afterwards the compressor), it is necessary to use a compressor having at least three compression stages in series in order to reach the fixed working pressure. The compressor is equipped with a flow rate regulation system connected to an electronic pressure transmitter, located in the gasification chamber. Being the aim the constant maintenance of the working pressure in the gasification chamber, as this increases, the compressor flow rate will increase too, and viceversa.

2.7 Fractionation of the Syngas into the Pure Gases

The fractionation unit of the syngas in pure gases consists of a series of equipment where the specific steps take place. The aims of this unit are the following ones: a) to carry out the catalytic conversion of the present CO into $H_2+CO_2$, thereby increasing the concentration of these two substances while minimizing CO which is the non-usable substance; b) absorption of $CO_2$ to remove it from the syngas stream; subsequent desorption to release pure $CO_2$ and final undercooling for the liquefaction and the storage; c) absorption of H2 to remove it from the residual syngas stream, desorption and final compression (if necessary) for the storage; d) feeding residual syngas stream, (tail gases) from previous treatments, to the boiler for the steam production.

The first section of this unit consist of the reactor for the conversion of $CO+H_2O$ into $CO_2+H_2$ in the presence of catalysts based on $ZnO$—$CuO$—$Al_2O_3$, which are active at 180-350° C. Syngas and steam streams are fed to this reactor at 25 bar pressure and at 280° C. In presence of the above mentioned catalysts, the conversion reaction $CO+H_2O \leftrightarrow CO_2+H_2$ takes place with a conversion efficiency $\cong 84\%$. The reaction is exothermic and the generated heat is recovered, using the gaseous stream from the reactor to heat the input stream to the conversion reactor by means of a heat exchanger.

The second section of this unit consists of a couple of columns for the separation of the $CO_2$ contained in the fed syngas.

30% Potassium carbonate in water solution is circulated in the columns at 80° C. Activators such as arsenic or selenium trioxide are used to increase the adsorption rate. In this condition, in the first column which is kept at about 22 bars, the exothermic reaction $K_2CO_3+H_2O+CO_2 \rightarrow 2KHCO_3$ takes place. At this column outlet the syngas mixture contains a CO2 residual percentage equal to 2% max. In the second column, $CO_2$ desorption takes place through the simple expansion and stripping in vapour stream of the aqueous solution, that is thereby regenerated and sent again to the first column. The $CO_2$ produced, at 99.5% purity, is cryogenically cooled and liquefied and finally sent to the storage box for the final use.

The third section of this unit consists of 2 columns for the separation of the hydrogen (at 99.9% purity) contained in the fed syngas. The columns work at 21 bar pressure and at a 40° C. temperature, and are filled with molecular sieves. The two columns should work alternately in order to have continuous hydrogen production. The syngas is fed to the first column, where the molecular sieves retain the other gaseous components, releasing only the hydrogen, which is sent to the storage tank. As soon as the molecular sieves reach saturation, this column is closed and the syngas is fed to the second column, while the first one undergoes regeneration through a nitrogen stream, to be ready for the next cycle. The separation performance of the fed hydrogen is 81% in comparison with the recovered one. The tail gases of this section, obtained during the nitrogen regeneration, are kept under 1.5 bar pressure and used as fuel gas in the boiler for the steam production.

| SYNGAS FRACTIONATION UNIT IN PURE GASES | | % |
|---|---|---|
| Composition of the syngas fed | H2 | 43 |
| to the FiRST SECTION ($\cong$) | CO | 38 |
| | CO2 | 13 |
| | N2 | 6 |
| | total | 100 |
| Composition of the syngas fed | H2 | 53 |
| to the SECOND SECTION ($\cong$) | CO | 3 |
| | CO2 | 40 |
| | N2 | 4 |
| CO2 recovered % 98 | total | 100 |
| Composition of the syngas fed | H2 | 82 |
| to the THIRD SECTION ($\cong$) | CO | 6 |
| | CO2 | 2 |
| | N2 | 10 |
| H2 recovered % 81 | total | 100 |
| Tail gases composition ($\cong$) | H2 | 38 |
| | CO | 23 |
| | CO2 | 4 |
| Tail gases quantity in relation to | N2 | 29 |
| The fed syngas % ($\cong$) 27 | H2O | 6 |
| | total | 100 |

For better explaining the features of this invention, the main construction characteristics of the equipment necessary to the process execution, are reported in the drawings herein enclosed, as illustrative but not limitative.

In FIG. 2, 1 indicates the apparatus according to the present invention. It consists of the raw materials feeding group 3, the gasification reactor 5, the discharge of solid residues in the vitrified form 7. The raw materials are transported from the storage tanks to the service tank 31 through traditional systems. By actuating the two-way valve 32, the raw materials are sent to the thickening channel 33. When this is fully filled, the two-way valve 32 is actuated again, thus sending the raw materials to the thickening channel 34. Simultaneously to actuation of the two-way valve, push piston 35 is operated, which presses the raw materials against the walls of the slide door valve 36, thereby attaining the desired density (0.6-0.8 Kg/dm$^3$). After completion of the thickening step, the push piston is stopped, the slide door vale 36 is opened, the push piston is operated again thus pushing the raw materials to the feeding channel 37. When the push piston has passed the slide door valve, it is stopped and moved back to the starting position, ready for the next cycle. The pressed raw materials reach, at the end of the feeding channel, the grinder 38, where their size is reduced; then the raw materials fall into the archimedean screw 39 below, which feeds them to the gasification reactor. The same working sequence is carried out through thickening channel 34, push piston 40, slide door valve 41, feeding channel 42, to ensure continuous feeding to the grinder. To guarantee safety in this part of the plant, a $CO_2$ flow is continuously fed through part 43, to inertize the whole feeding section.

The feeding section of the gasification reactor consists of cylindrical section 51, equipped with an inspection door 52 in the upper part, and with the flanged junction 53 in the lower part, for the connection to the section below. On the wall of the cylinder there is a flanged junction 54 for the connection to the feeding archimedean screw 39, transporting the substances to be gasified from grinder 38 to reactor 5.

The variable thermal profile gasification area consists of a series of cylindrical sections of reactor 55, which can be placed one on top of the other even if they have different diameters, thanks to the frustum-conic tapers 56 which allow the coupling. Each part of this area is equipped with at least a couple of thermal torches 57, at least one meter distant and alternately set at 180° one from the other. In front of each torch, on the opposite side of the cylinder, a probe 58 is installed for the temperature survey. According to the temperature setting in the thermal profile arranged for that reactor, each probe will regulate the fuel quantity of the corresponding torch, in order to keep the exact temperature foreseen in that point. The lower part the gasification chamber ends with the cylindrical section 59. This cylindrical frustum is equipped with flanged junctions at its ends for the connection upwards to the gasification section, and downwards to the solid residues discharge area. On the cylinder wall there are two output doors 60 of the syngas for the next treatment steps.

The discharge area 7 of solid residues consists of a horizontally oriented parallelepiped melter, having a slope between 4% and 8%. At one of the two ends, at the upper side, the coupled connection 71 is set, which connects the melter to the gasification area through connection cylindrical section 59.

At the bottom opposite side, the gasification solid residues outlet 72 is located. The residues are melted as guaranteed by the working of the torches 73. The temperature, pre-set in this area at ≅1500° C., is measured by probe 74, which regulates the fuel flow to torches 73 with a slightly oxidizing flame, to ensure the thermal oxidation of any carbon included in the gasification solid residues. The outlet 72 is connected to container 75, which is kept at constant level with water. Gasification solid residues, melted by the high temperature, go along the melter, which is made easier by the slope, and go out of the outlet 72 to reach the water inside container 75, where they undergo violent cooling, thus vitrifying. The archimedean screw 76 provides the continuous transport of the vitrified residues from container 75 to container 77.

Figure 3:
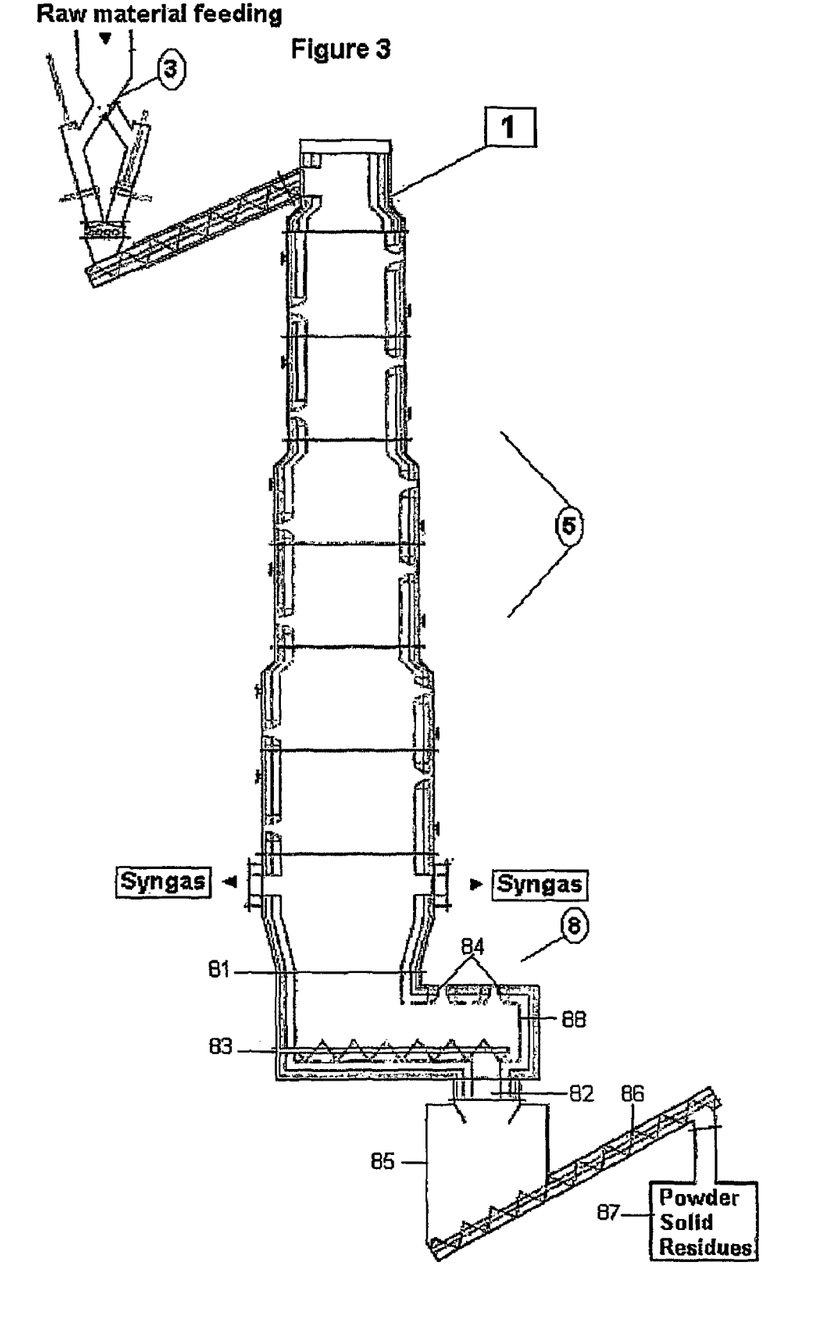
FIG. 3 Scheme of the gasification apparatus, according to the present invention, with the discharge of solid residues in the powdery form.

In FIG. 3, number 1 indicates the apparatus according to the invention. It consists of: raw materials feeding group 3; gasification reactor 5; the discharge system of the solid residue in powdery form, 8. Feeding group 3 and gasification reactor 5 are exactly the same as those described in FIG. 2. In the discharge area of gasification solid residues in powdery form, discharge thermal oxidation is carried out to remove any carbon traces. This area consists of the cylindrical (horizontal) chamber 8 connected to gasification area 5 through connecting cylindrical section 59, as well as inlet 81, located at one of the ends of the upper part of the chamber itself. At the other end of the chamber, but on the lower side, outlet 82 for the powder solid residues is present. Inside this cylinder, at least 1 cm. high from the lower part, screw pump 83 is located, for transporting the solid residues from the gasification section to outlet 82. The final oxidation of the powdery solid residues is carried out by the flame of torches 84, fed by oxygen excess. The solid residues from discharge door 82 enter container 85, where through archimedean screw 86 are transported to mobile container 87 to be sent to the final destination.

Figure 4:
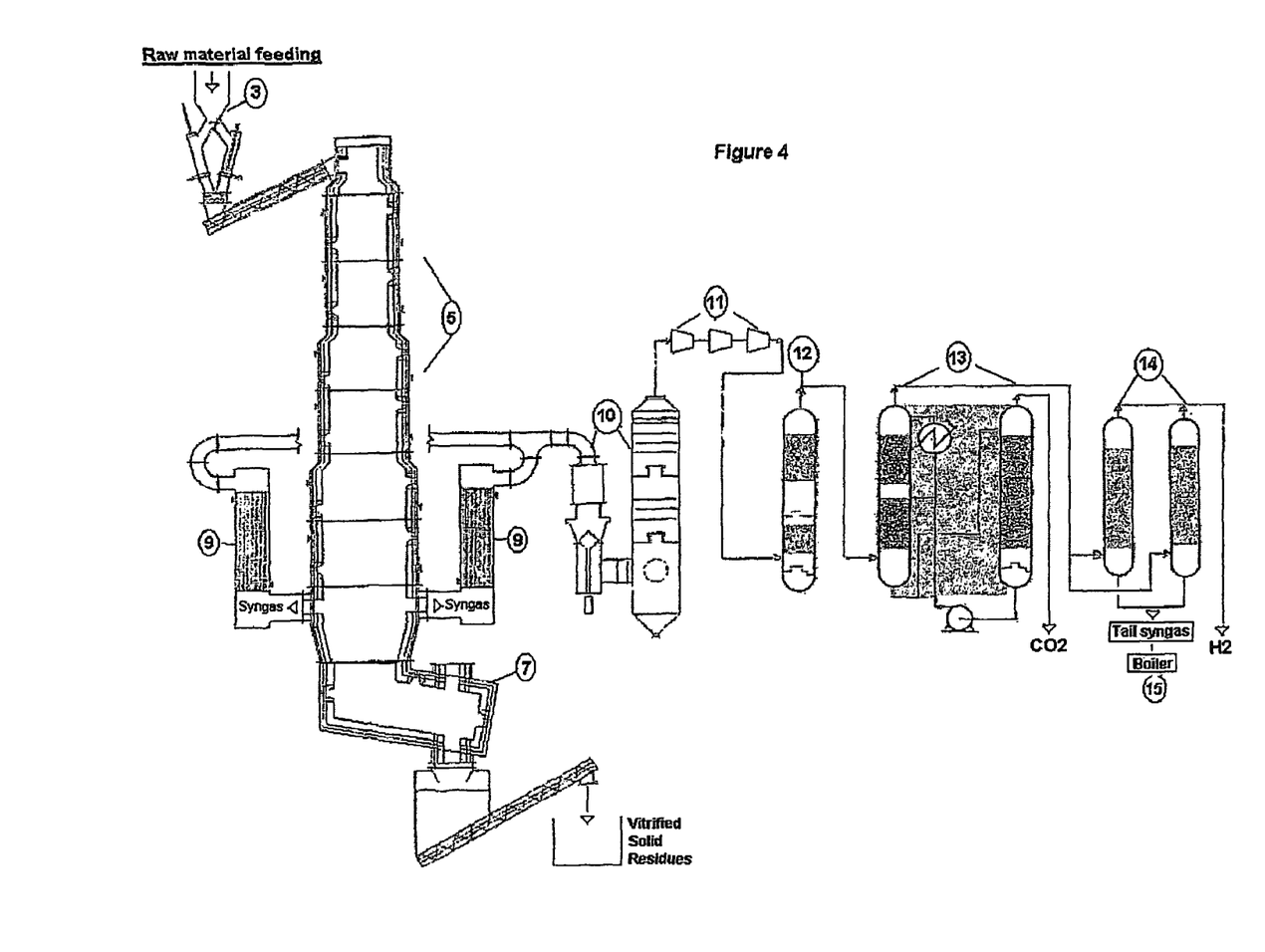
FIG. 4 Scheme of the apparatus necessary for the process according to the present invention, for producing $H_2$ and $CO_2$ at high purity, from the raw materials feeding.

FIG. 4 shows the raw materials feeding group 3; gasification reactors 5; discharge and vitrification system of gasification solid residues 7; heat exchangers 9; syngas purification equipment 10; syngas compressor units 11; the catalytic reactors 12 for the conversion $CO+H_2O$ into $H_2+CO_2$; adsorption and desorption columns 13 for $CO_2$ separation; the two columns 14 alternately operating $H_2$ separation from the syngas; boiler for steam production 15, using tail gases from the previous steps as alternative fuel.

The invention claimed is:

1. A process for the production from liquid, muddy or solid raw materials of pure syngas comprising hydrogen and carbon dioxide with a purity of higher than 99%, the process comprising the following steps:

(a) providing a vertically oriented monotubular reactor that widens in diameter from top to bottom, the reactor comprising a gasification area comprising a plurality of torch couples that regulate the temperature in the gasification area and provide the gasification area with a thermal profile wherein the temperature at a lower part of the gasification area is higher than the temperature at an upper part of the gasification area, the reactor comprising a feeding channel at the top such that raw materials fed into the reactor through the feeding channel flow through the gasification area to a discharge area at the bottom of the reactor;

(b) compressing and thickening of the raw materials with the elimination of air from the raw materials and feeding the raw materials into the gasification area of the reactor through the feeding channel, the compressing and thickening generating a differential pressure that prevents air from entering the reactor through the feeding channel and also prevents syngas generated in the reactor from leaving through the feeding channel;

(c) gasifying the raw materials in the gasification area of the reactor in a reducing atmosphere, the thermal profile in the gasification area, the rate at which the raw materials are fed into the reactor in step (b), and the particle size of the raw materials fed into the reactor in step (b) being controlled such that, in the gasification, there is no accumulation of the raw materials within the reactor and only solid residues which cannot be gasified descend into the discharge area at the bottom of the reactor;

(d) gathering the solid residues which cannot be gasified in the discharge area; and (e) recovering syngas generated in the gasifying step (c) and treating the recovered syngas to obtain the pure syngas comprising hydrogen and carbon dioxide with the purity of over 99%.

2. A process according to claim 1, wherein in step (b) the raw materials are first compressed to remove the air therein; then the raw materials are fed through a differential pressure system to prevent external air from entering the reactor; then the raw materials are ground to a controlled size to make fast gasification easier and, for safety, the raw materials are fed to the gasification area under inert atmosphere by a $CO_2$ stream.

3. A process according to claim 1, wherein the gasification area of the monotubular reactor consists of a plurality of thermal zones, obtained in cylinder sections of ≅1 to 3 m length, having inner diameter between ≅0.5 m min. and ≅2.5 m max. wherein a working temperature of each of the plurality of thermal zones is set between ≅350° C. and 1200° C.

4. A process according to claim 3, wherein each of the thermal zones has its own couple of torches, wherein temperature in each of the thermal zones is measured by a thermocouple which, through an electric circuit, regulates the flow of fuel and oxygen, as comburent, dosed in stoichiometric ratios.

5. A process according to claim 1, wherein the discharge area comprises an archimedean screw for discharging powdery residues, said method comprising a final thermal oxidation to remove carbon traces from the powdery residues.

6. A process according to claim 1, wherein the discharge area is steep to allow molten solid residuals to flow, wherein to facilitate removal of carbon traces from the solid residuals in a final thermal oxidation.

7. A process according to claim 6 wherein the discharge area comprises a plurality of torches, independent of the torch couples of the gasification area, for regulating a temperature in the discharge area.

8. A process according to claim 7 wherein the torches of the discharge area are fed by an excess of comburent, thereby creating a slightly oxidizing area which provides for removal of carbon from the solid residues.

9. The process according to claim 1, wherein the torch couples in the gasification area are disposed at 180° to one another.

10. The process according to claim 1, wherein the temperature in the upper part of the gasification area is at a minimum of about 350° C.

11. The process according to claim 10, wherein the temperature in the lower part of the gasification area is at a maximum of about 1200° C.

12. The process according to claim 11, wherein the solid residues descending into the discharge area are oxidized and discharged in powdery form or oxidized and melted with subsequent vitrification by cooling in water.

13. The process according to claim 7 further comprising ascertaining whether the solid residues descending into the discharge area are in powdery or vitrified form and regulating the temperature in the discharge area accordingly.

* * * * *